No. 726,530. PATENTED APR. 28, 1903.
A. G. HAMM.
MEANS FOR MANUFACTURING SHEET GLASS.
APPLICATION FILED DEC. 16, 1901.
NO MODEL.

ATTEST
R. B. Moser
T. Madden.

INVENTOR
Adolph G. Hamm
BY H. T. Fisher ATTY

UNITED STATES PATENT OFFICE.

ADOLPH G. HAMM, OF AKRON, OHIO.

MEANS FOR MANUFACTURING SHEET-GLASS.

SPECIFICATION forming part of Letters Patent No. 726,530, dated April 28, 1903.

Application filed December 16, 1901. Serial No. 86,077. (No model.)

*To all whom it may concern:*

Be it known that I, ADOLPH G. HAMM, a citizen of the United States, residing at Akron, in the county of Summit and State of Ohio, have invented certain new and useful Improvements in Means for Manufacturing Sheet-Glass; and I do declare that the following is a full, clear, and exact description of the invention, which will enable others skilled in the art to which it appertains to make and use the same.

My invention relates to the manufacture of glass by mechanical appliances; and the object of the invention is to provide means more especially adapted to making sheet-glass; but it is not thus limited in all its forms; and the invention therefore consists in the construction and combination of parts, substantially as shown and described, and particularly pointed out in the claims.

Figure 1:
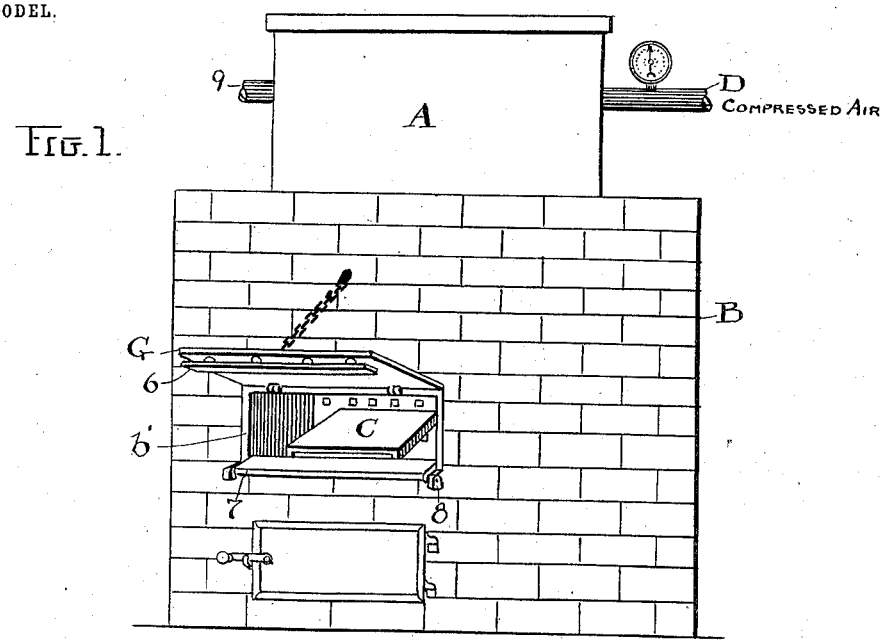
Figure 2:
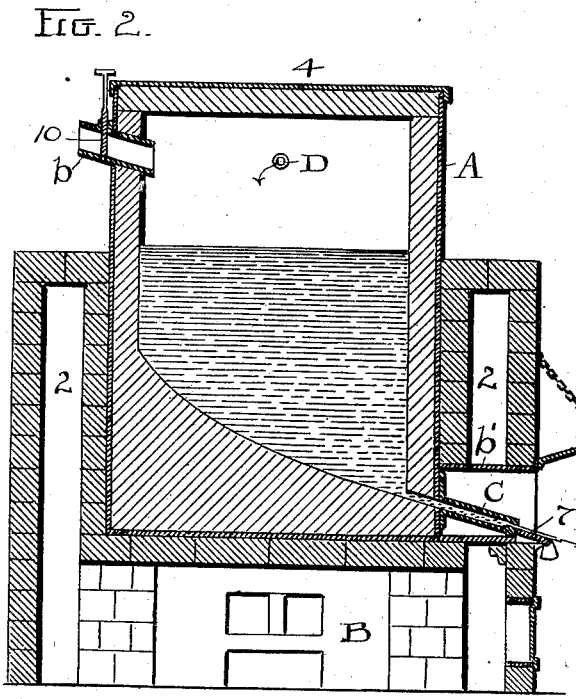
Figure 3:
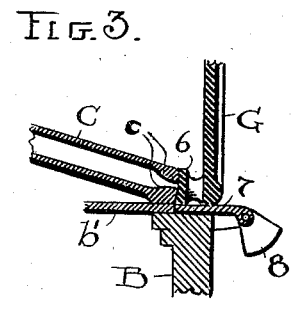
Figure 4:
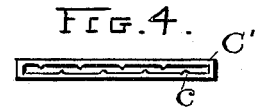

In the accompanying drawings, Figure 1 is a front elevation of a furnace and a portion of a receptacle or tank for receiving and discharging molten glass, and Fig. 2 is a vertical sectional elevation of Fig. 1 on a line substantially central of the furnace and tank front to rear. Fig. 3 is a sectional elevation of the discharge channel or spout and the door therefor, as hereinafter described. Fig. 4 is a modified form of the discharge channel or spout.

In the drawings I show a single tank or receptacle A and a furnace B, into which the tank is built, and this tank is designed simply for keeping the glass in a fluid or molten state and for feeding the same to give the glass its commercial shape, and I have omitted the associated parts, comprising the supply for tank A, except as I show a pipe or spout $b$ for introducing the molten material. Neither do I show the mechanism by which the glass is received and handled after it leaves the discharge channel or spout C at the bottom of tank A.

My present invention therefore consists especially in a tank, substantially as shown, constructed to receive molten glass from any source of supply and to discharge the same under an artifically-sustained pressure through a suitably-shaped passage or channel not unlike a mere slot in effect, as shown in Fig. 1, and marked here as channel or spout C. This part, described for convenience as a channel or spout, is so constructed as to reduce the outflowing glass to a thin flat continuous sheet, and the said channel is detachably fixed on box $b'$, set detachably in the side of the furnace-wall. This box has such width as will accommodate a channel or spout of different widths, according to the width of glass to be made, or I may have different sizes of boxes, also, according to the size of channel. The width of the channel determines the width or other shape of the sheet or other form of glass produced, and from such channel the glass passes onto a suitable carrier or traveling apron, (not shown,) where it is supposed to be handled in such a manner as the flat or other shape of the glass may require, whether it be of window-glass size or of some other size or form in width and thickness.

The box $b'$ protects channel C from direct contact with the flame of the furnace and yet allows heat enough to pass through to keep the glass in the channel from chilling. Door G, pivoted to swing downward over the box $b'$, is adapted also to close the mouth of spout or channel C and shut off the flow of glass, as seen in Fig. 3, and has a closing-plate 6 on its rear supported from door G, which avoids chilling from said door. The plate 7, having a counterweight 8, receives the glass from channel C, but is depressed by door G when it is closed.

The furnace may be adapted to be heated with natural or other gas or fuel for sustaining the requisite temperature in tank A, and it will be noticed that said furnace is so constructed that there is a heat-space 2 all around the same as well as beneath. The tank A may be of boiler plate or casting and has a lining of fire-brick and a removable top 4, which is fluid-tight and secured in place by any suitable means.

As a minor feature I show the mouth of channel or spout C provided with internal lips $c$, which have the effect of reducing the thickness of the outlet by that much, and the said lips are rounded, so as to have the effect of smoothing the surface of the glass as well as determining its thickness.

In Fig. 4 the channel C' is shown as having internal projections which will score the sheet of glass passing through and give it more or less grooved or corrugated surfaces. Other forms of channels might also be suggested.

When the tank A has been resupplied, the valve or cut-off 10 in pipe b is closed, which confines the air-pressure to said tank, and pipe 9 affords an outlet for the air when a new charging of tank A is required.

The discharge-channel C is detachably fixed to or connected with the metallic casing of the tank by means of screws through the flanges of the said channel, so that it can be removed and replaced when occasion requires.

What I claim is—

1. In glass manufacture, the tank and the discharge-channel at its bottom, and a door to close the discharge from said channel a flat plate on its closing side and provided with an open space between the plate and the door to prevent chilling from the door, substantially as described.

2. The tank and the furnace-walls built about the tank a detachable box set into an opening in the said wall, and a discharge-channel for said tank detachably secured within said box to the tank, substantially as described.

Witness my hand to the foregoing specification this 10th day of December, 1901.

ADOLPH G. HAMM.

Witnesses:
R. B. MOSER,
H. T. FISHER.